United States Patent [19]

Kayanuma

[11] Patent Number: 5,140,468
[45] Date of Patent: Aug. 18, 1992

[54] ZOOM LENS DEVICE

[75] Inventor: Yasunobu Kayanuma, Tokyo, Japan

[73] Assignee: Fuji Photo Film Co., Ltd., Kanagawa, Japan

[21] Appl. No.: 657,802

[22] Filed: Feb. 20, 1991

[30] Foreign Application Priority Data

Feb. 26, 1990 [JP] Japan .................................. 2-045253
Oct. 12, 1990 [JP] Japan .................................. 2-274320

[51] Int. Cl.⁵ .............................................. G02B 15/00
[52] U.S. Cl. .................................. 359/699; 359/696; 359/700
[58] Field of Search ............... 359/694, 695, 696, 697, 359/698, 699, 700

[56] References Cited

U.S. PATENT DOCUMENTS

| | | | |
|---|---|---|---|
| 3,663,093 | 5/1972 | Iida | 359/700 |
| 4,054,372 | 10/1977 | Schröeder | 359/700 |
| 4,472,032 | 9/1984 | Kamata et al. | 359/699 |
| 5,016,993 | 5/1991 | Akitake | 359/696 |
| 5,037,187 | 8/1991 | Oda et al. | 359/699 |

Primary Examiner—Carolyn E. Fields
Assistant Examiner—Drew A. Dunn
Attorney, Agent, or Firm—Sughrue, Mion, Zinn, Macpeak & Seas

[57] ABSTRACT

A zoom lens device capable of performing magnification varying and focusing operations by moving part of an optical system. Magnification varying and focusing lens groups guided movably in an optical axis direction by two or more parallel guide shafts. One of the guide shafts is fixed such that it is located inside the extreme side end of a camera main body. Thus, the lens group of the zoom lens can be embedded in the camera main body so as to provide a compact camera. Also, the zoom lens can be assembled simply by inserting parts forming the zoom lens device over the guide shafts, which can improve the assembling of the zoom lens.

5 Claims, 7 Drawing Sheets

ZOOM LENS DEVICE

BACKGROUND OF THE INVENTION

1. Field of the Invention

The present invention relates to a zoom lens device and, in particular, to a zoom lens device which is capable of varying magnification and focusing by moving part of an optical system.

2. Description of the Related Art

Conventionally, as shown in FIG. 10, a general video tape recorder (which is hereinafter referred to as VTR) has a lens barrel 8 in which a lens 10, a lens frame 12, guide shafts 14, 14, a cam ring 16, a fixed lens barrel 18, and actuators 20, 22 are arranged in this order starting from an optical axis L to the outer side of the lens barrel 8.

In the above structure, because the cam ring 16 is disposed in the fixed lens barrel 18, the fixed lens barrel is made to have a large diameter. For this reason, as shown in FIG. 10, if the side portion of the the fixed lens barrel 18 is fixed to the outer case of a main body of a camera, a mechanical deck or the like, then the projecting dimension of the lens barrel from a main body 24 of the VTR becomes great, which results in a poor space efficiency (as shown in FIG. 11) and thus makes it difficult to reduce the VTR to a compact size.

Also, in order that the conventional lens barrel using the cam ring 16 can be made compact, the respective components of the lens barrel must be reduced in size. However, such size reduction of the components leads to the difficult assembling of the components.

SUMMARY OF THE INVENTION

The present invention aims at eliminating the drawbacks found in the above-mentioned prior art zoom lens device.

Accordingly, it is an object to provide a zoom lens device which is capable of enhancing the space efficiency of a lens barrel and easily making a VTR compact without impairing the assembling of the lens barrel.

In order to achieve the above object, according to one aspect of the invention, a magnification varying lens group and a focusing lens group of the the zoom lens can be respectively guided by two or more guide shafts which are parallel to one another in such a manner that the magnification varying and focusing lens groups can be moved in the optical axis direction, and one of the guide shafts is fixed in such a manner that it is located inside a chassis fixed longitudinally at the extreme side end portion of the camera main body.

Also, in order to attain the above object, according to another aspect of the invention, lens groups including the magnification varying and focusing lens groups of the zoom lens, a stop diaphragm and a lens barrel are respectively inserted through or fitted into two or more parallel guide shafts to thereby assemble a zoom lens, and in parallel to the zoom lens there is disposed drive means for driving the magnification varying and focusing lens groups of the zoom lens in the optical axis direction.

According to the invention, two or more guide shafts are arranged in parallel to one another and the present zoom lens can be supported by these parallel guide shafts, and at the same time one of the guide shafts can be embedded and mounted inside of a chassis which is fixed longitudinally at the extreme side end portion of a camera main body. For this reason, the space efficiency of a lens barrel can be enhanced to thereby realize high production of a compact camera.

Also, according to the invention, due to the fact that the present zoom lens can be assembled simply by inserting all components of the zoom lens into the guide shafts, there can be eliminated fine adjustments and similar complicated operations in assembling the zoom lens.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiments of a zoom lens device according to the present invention with reference to the accompanying drawings.

Figure 1:
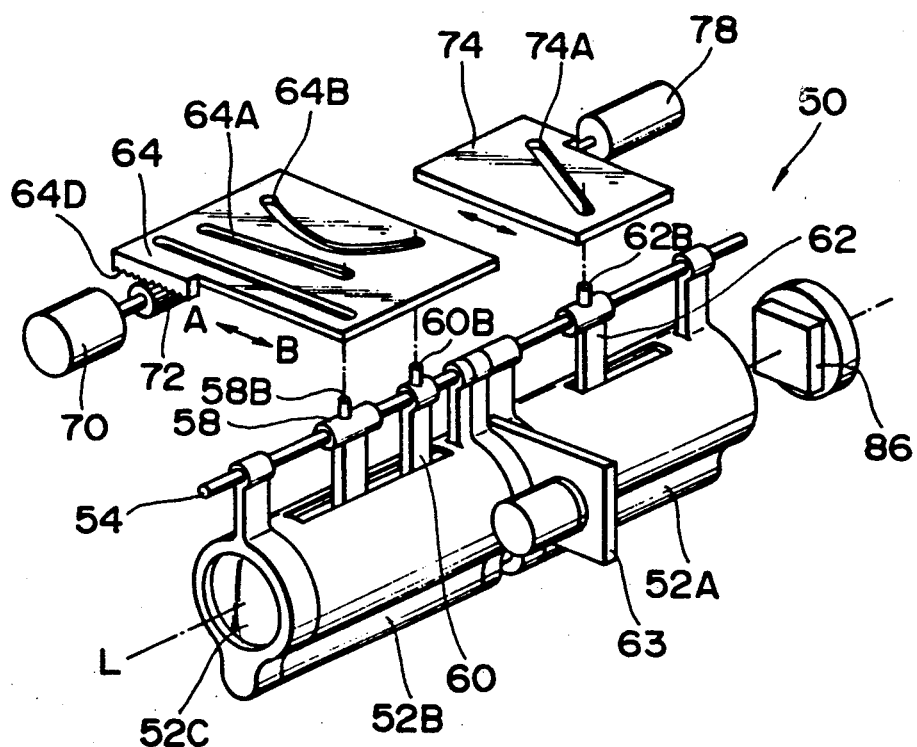
FIG. 1 is a perspective view of a first embodiment of a zoom lens device according to the invention.
Figure 2:
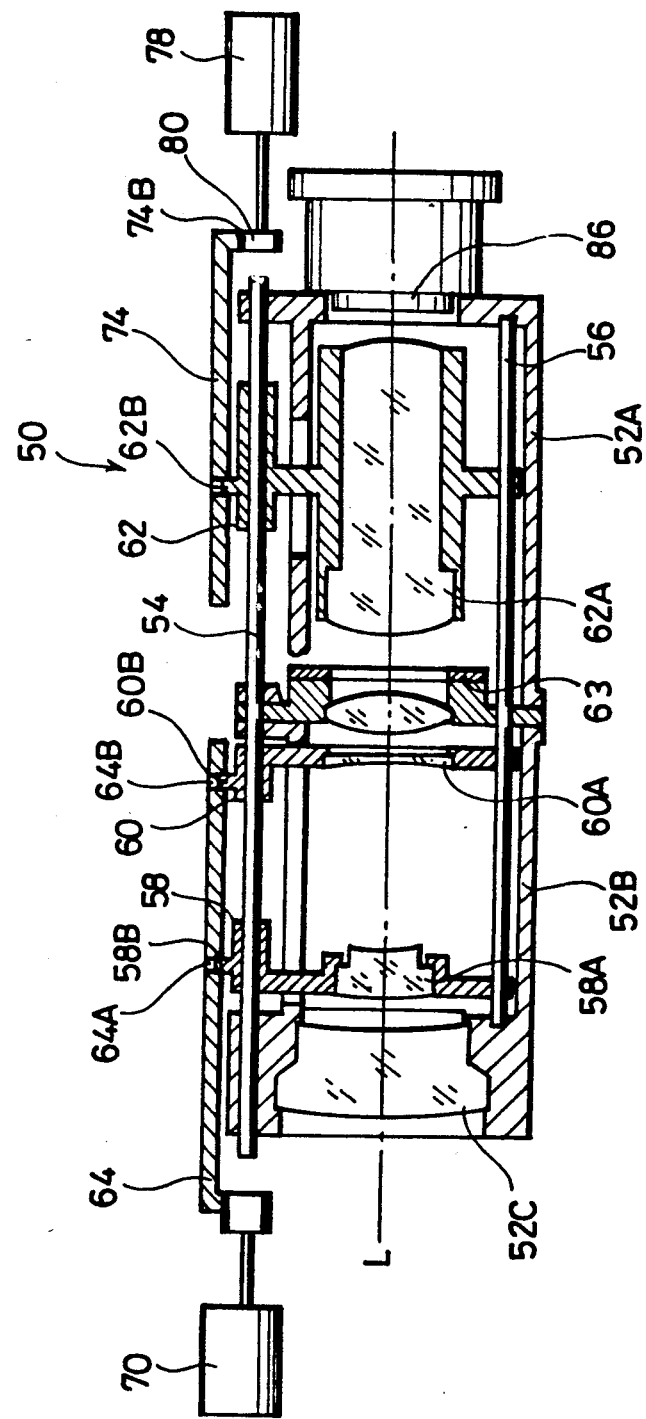
FIG. 2 is a sectional view of the embodiment shown in FIG. 1.

In FIG. 1, there is shown a perspective view of a first embodiment of a zoom lens device according to the invention (which is a zoom lens of a rear focus type), and in FIG. 2 there is shown a sectional view of the first embodiment.

In these figures, a zoom lens 50 has first and second lens barrels 52A, 52B and a front lens group 52C is disposed in the second lens barrel 52B. First and second guide shafts 54, 56 are respectively fixed to the upper and lower portions of the first and second lens barrels 52A, 52B in such a manner that they extend in parallel to an optical axis L. Also, an iris 63 is fixed to the guide shafts 54, 56 between the first and second lens barrels 52A and 52B. Further, a magnification varying lens frame 58, a compensator lens frame 60 and a focus lens group frame 62 are slidably supported by the guide shafts 54, 56. A magnification varying lens 58A, a compensator lens 60A (these form a magnification varying part) and a focus lens group 62A (forming a focusing part) are disposed in the frames 58, 60 and 62, respectively. The guide shaft 54, as shown in FIG. 3, is supported by mount members 53A, 53B of a chassis 53 provided in a camera main body.

In this manner, since the respective frames 58, 60 and 62 slidably supported by the guide shafts 54, 56 are formed in such a manner that a distance from the axis of the first guide shaft 54 to the optical axis is constant, by simply fitting bores, which are respectively formed in the frames 58, 60 and 62, over the guide shafts 54 and 56 and holding the frames 58, 60 and 62 with the guide shafts 54, 56, the magnification varying lens 58A, compensator lens 60A and focus lens group 62A can be disposed coaxially.

Also, the varying lens frame 58 and compensator lens frame 60 are provided with projections 58B, 60B, respectively. The respective projections 58B and 60B are slidably fitted into first cam groove 64A and a second cam groove 64B respectively formed in a zooming cam plate 64. Further, the zooming cam plate 64 is also formed with a groove 64C into which buttons 68A and 68B for guide adjustment are fitted. And, projected portions respectively provided in the top portions of the buttons 68A, 68B and guide plates 66, 66,—respectively shown in FIGS. 3 and 4 support the zooming cam plate 64 slidably in a direction (a direction of arrows A—B in FIG. 4) perpendicular to the optical axis direction. The buttons 68A, 68B are supported movably in the optical axis direction (a direction of arrows C-D).

Figure 3:
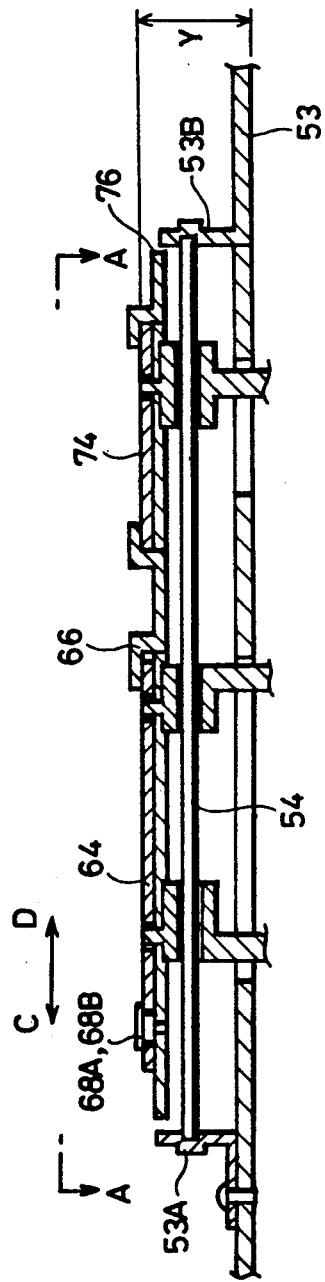
FIG. 3 is a partially enlarged view of FIG. 2.
Figure 4:
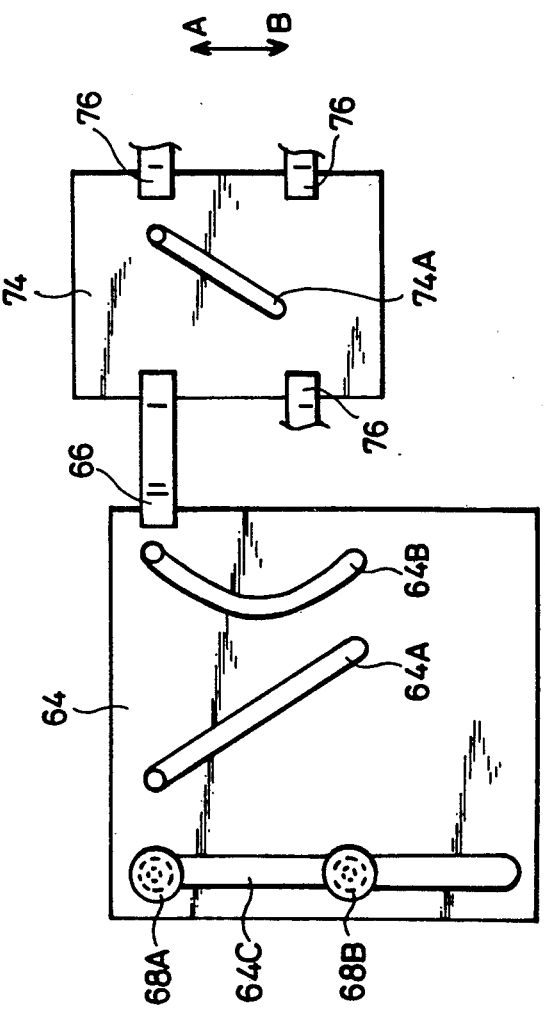
FIG. 4 is a view taken along an arrow A—A in FIG. 3.

As shown in FIGS. 3 and 4, the buttons 68A and 68B respectively include the projected portions in the top portions thereof. However, the invention is not limited to this but, as shown by guide adjust buttons 68A' and 68B' in FIGS. 5 and 6, other types of buttons including no projected portions can also be used. When the buttons 68A' and 68B' are used, in order to support the zooming cam plate 64 on the chassis 53, guide plates 66 and 66 must be provided in the buttons 68A' and 68B' as well.

Further, in the zooming cam plate 64, as shown in FIG. 1, there is provided a gear 64D with which a gear 72 fixed to the drive shaft of a zoom actuator 70 is meshing. For this reason, if the zoom actuator 70 is driven and thus the gear is rotated, then the zooming cam plate 64 is moved through the gear 64D in the direction of the arrows A—B in FIG. 1, so that the projections 58B and 60B in the cam grooves 64A and 64B as well as the varying lens frame 58 and compensator lens frame 60 are slid along the first and second guide shafts 54 and 56.

Figure 5:
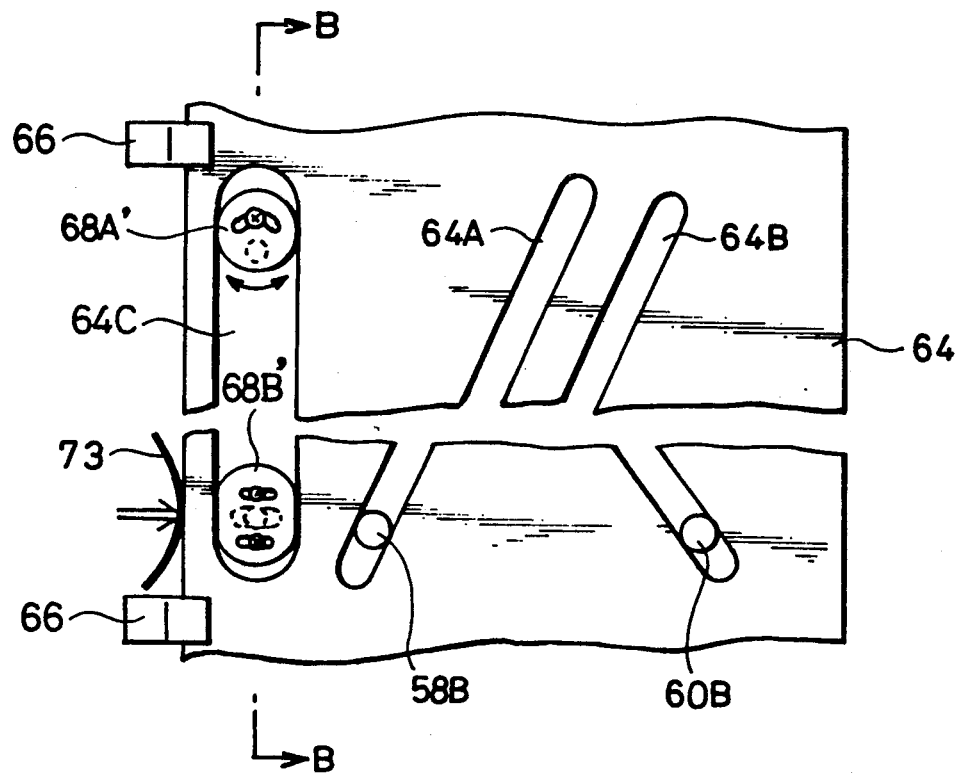
FIG. 5 is a partially enlarged view of FIG. 3.
Figure 6:
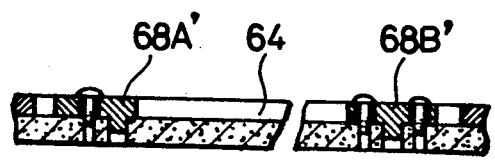
FIG. 6 is a sectional view taken along a line B—B in FIG. 5.

If the guide adjust buttons 68A, 68B shown in FIGS. 3 and 4 or the guide adjust buttons 68A', 68B' shown in FIGS. 5 and 6 are adjusted, then the zooming cam plate 64 is moved in the optical axis direction (in the directions of arrows C—D in FIG. 3), so that the varying lens frame 58 and compensator lens frame 60 can be moved at the same time in the optical axis direction by means of the projections 58B and 60B. As a result of this, the positional relation between the varying lens 58A, compensator lens 60A and the focus lens group 62A can be adjusted and thus an INF (infinity) adjustment can be made, so that there can be eliminated the shifting of the focusing positions at the W (wide) end and T (Tele) end that could be caused by zooming.

Explaining such adjustment as to the buttons 68A' and 68B' shown in FIG. 5, the button 68A' is firstly rotated in a direction of an arrow in FIG. 5 to thereby adjust the zooming cam plate 64 and the button 68B' is next moved in the arrow direction to thereby adjust the zooming cam plate 64. For this reason, in this case, there is eliminated the need that a front lens part 52C is made in a dual structure which allows the front lens part 52C to be adjusted with respect to other lens groups.

A cam plate for focusing 74 includes a third cam groove 74A formed therein and the above-mentioned projection 62B of the focus group frame 62 is engaged with the third cam groove 74A. The focusing cam plate 74 is supported by guide plates 66, 76, 76, and 76 (which are shown in FIGS. 3 and 4, respectively) slidably in the direction of arrows A—B in FIG. 4. Also, as shown in FIG. 2, similarly to the zooming cam plate 64, there is provided a gear 74B in the focusing cam plate 74 and a gear 80 fixedly secured to the drive shaft of a focus actuator 78 is meshing with the gear 74B.

In this construction, if the focus actuator 78 is driven and thus the gear 80 is rotated, then the focus cam plate 74 is moved in the direction of the arrows A—B in FIG. 4 by means of the gear 74B. For this reason, the focusing group frame 62, together with the projection 62B, is slid in the optical axis direction along the first and second guide shafts 54 and 56. This allows the focus lens group 62A to be slid in the optical axis direction. Here, in FIG. 1, reference numeral 86 designates an image pickup element.

Now, description will be given below of the operation of a zoom lens device according to the present invention constructed in the above-mentioned manner.

At first, assembling of the zoom lens 50 will be described. The first lens barrel 52A and focus group frame 62 seen in the right in FIG. 2 are fitted over the guide shafts 54 and 56 by means of the bores respectively formed in the first lens barrel 52A and focus group frame 62. Then, after the iris 63 is similarly fitted over the guide shafts 54 and 56, the compensator lens frame 60 and varying lens frame 58 are similarly fitted over the guide shafts 54 and 56. Finally, the second lens barrel 52B including therein the front lens group 52C is fitted over the guide shafts in a similar manner to the first lens barrel, which completes the assembling of the zoom lens main body. As described above, according to the invention, simply by placing the lens groups, iris and lens barrels (which form the zoom lens) over the guide shafts 54 and 56, the main body of the zoom lens can be assembled with no fine adjustments.

Figure 8:
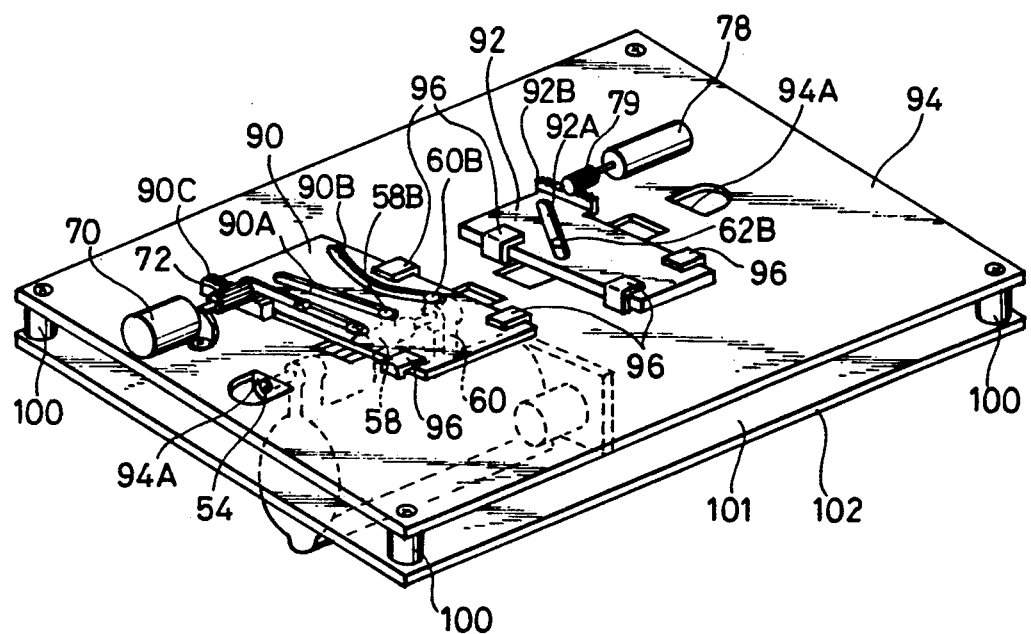
FIG. 8 is a perspective view of a second embodiment of a zoom lens device according to the invention.

When mounting the zoom lens assembled in the above-mentioned manner to the camera main body, both ends of the first camera guide shaft 54 are supported by the fixed members 53A and 53B of the camera main body 53, as shown in FIG. 3. For this reason, if the zoom lens main body is mounted to the camera main body 53, then the upper end portion Y of the lens barrel member in FIGS. 3 and 8 is embedded in the camera main body 53.

Next, description will be given below of the operation to be performed when the thus assembled zoom lens device is used.

Referring at first to a case where the magnification varying operation is to be performed, if the zoom actuator 70 is driven to thereby rotate the gear 72, then the zooming cam plate 64 is slid through the gear 64D in the direction of the arrows A—B in FIG. 1. This causes the cam grooves 64A and 64B to be moved in the arrows A—B direction and, as a result of this, the projections 58B and 60B are guided by the cam grooves 64A and 64B respectively so that the varying lens frame 58 and compensator lens frame 60 can be slid in the optical direction along the first and second guide shafts 54 and 56. For this reason, the varying lens 58A and compensator lens 60A are slid in the optical direction so as to be able to perform the magnification varying operation.

Referring now to a case where the focusing operation is to be performed, if the focus actuator 78 is driven to thereby rotate the gear 80, then the focusing cam plate 74 is slid through the gear 74B in the arrows A—B direction in FIG. 1. This causes the cam groove 74A to be moved in the arrows A—B direction and thus the projection 62B is guided by the cam groove 74A, so that the focus group frame 62 can be slid along the first and second guide shafts 54 and 56. As a result of this, the focus lens group 62A is moved in the optical axis direction so as to be able to perform the focusing operation.

Figure 7:
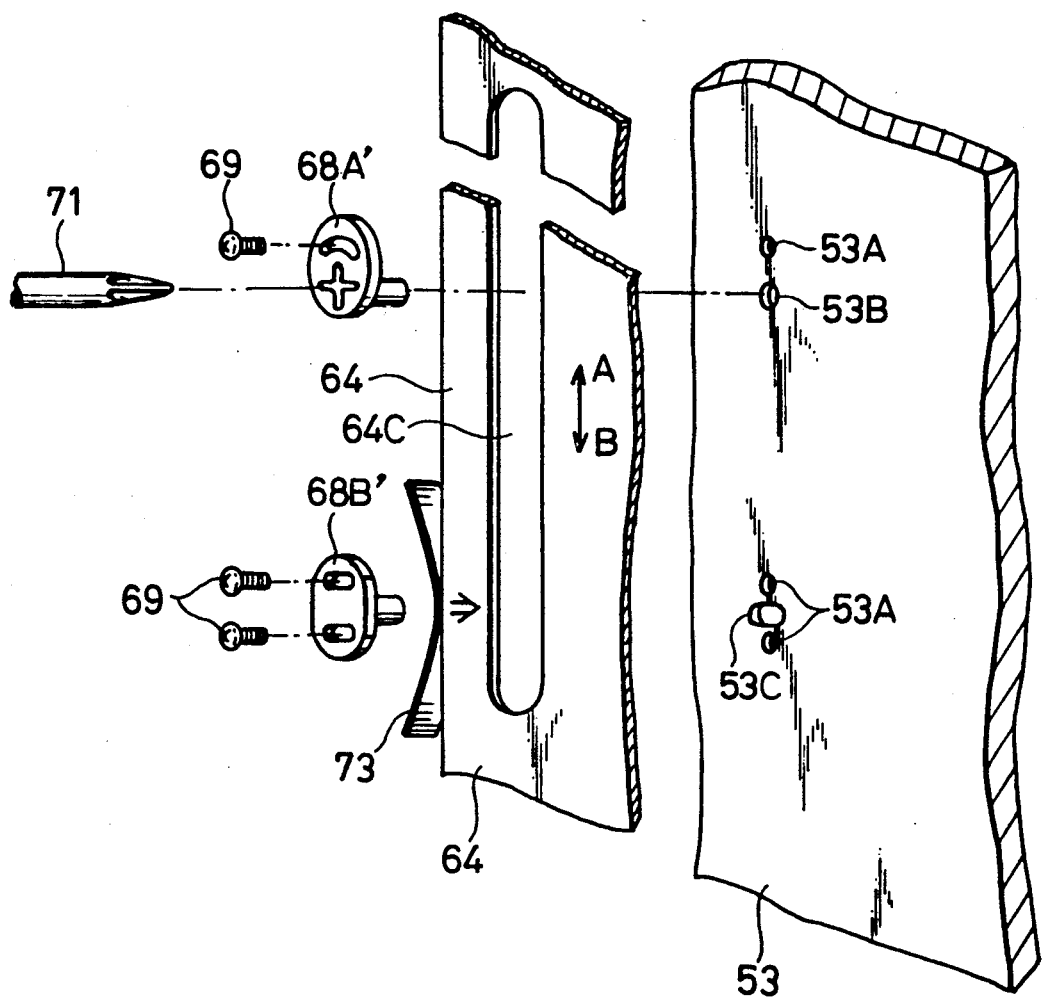
FIG. 7 is an enlarged view of a member used for the INF adjustment of a zoom lens device according to the invention.

Next, description will be given below of the adjustments for prevention of the shifting of the focal positions at the W and T ends caused by zooming with reference to FIG. 7. At first, by threadedly engaging the screws 69, 69,—with the screw holes 53A, 53A,— formed in the camera main body, the guide adjust button 68A' is provisionally engaged with the hole 53B and the button 68B is provisionally engaged with the hole 53C. In this case, a plate spring 73 is in contact with the side portion of the zooming cam plate 64 on the left of the guide adjust button 68B. In this state, the zooming cam plate 64 is free to move in the vertical direction (that is, in the arrows A—B direction) in FIG. 7. Here, since the center of rotation of the button 68A' is offset and also the portion of the button 68B' to be in contact with the groove 64C is formed in a linear shape, if the screws 69, 69, 69 are loosened and the guide adjust button 68A' is rotated clockwise or counter-clockwise by means of a driver 71, then the button 68B' can be moved in a direction perpendicular to the above-mentioned vertical direction by the plate spring 73 and thus the zooming cam plate 64 can be moved in the optical axis direction.

As a result of this, not only the magnification varying lens frame 58 and compensator lens frame 60 but also the varying lens 58A and compensator lens 60A can be moved in the optical axis direction with a constant distance maintained therebetween so that the positional relation between the focus lens group 62A and the above-mentioned varying lens 58A and compensator lens 60A can be adjusted.

As mentioned above, according to the zoom lens device of the invention, the zooming cam plate 64, focusing cam plate 74 and the like (including the upper end portion Y) can be embedded in the camera main body 53 shown in FIG. 3, so that a compact VTR can be realized.

Figure 10:
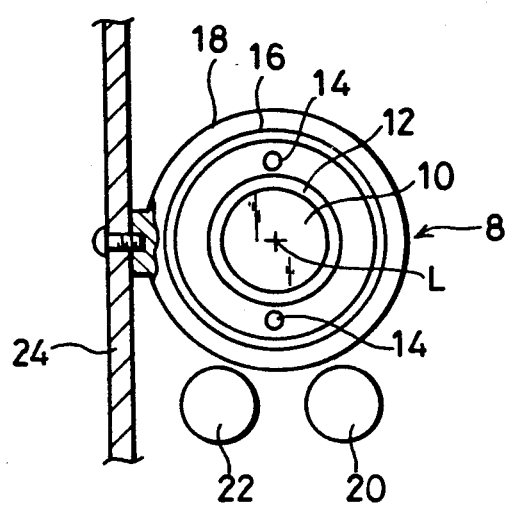
FIG. 10 is a front view of a zoom lens device according to the prior art.

Also, according to the invention, the cam ring 16, which has been used in the conventional zoom lens and shown in FIG. 10, can be replaced by the zooming cam plate 64 and focusing cam plate 74, so that the diameter of the fixed lens barrel 52 can be reduced.

Further, the zoom lens can be assembled simply by placing the components forming the zoom lens over the two guide shafts 54 and 56, so that the assembling of the zoom lens can be simplified.

In the above-mentioned embodiment, the zooming cam plate 64 and focusing cam plate 74 include the gear 64D and 74B in the lower surfaces thereof, respectively. However, the invention is not limited to this but other types of zooming and focusing cam plates can also be used. For example, such zooming cam plate 90 and focusing cam plate 92 as shown in FIG. 8 can be used and gears 90A and 92A for moving can be formed on the upper surfaces of the zooming and focusing cam plates 90 and 92, respectively. Description will be given below in detail of another embodiment of a zoom lens device according to the invention with reference to FIG. 8. In FIG. 8, the same or similar parts as used in the previously-described embodiment are given the same designations and the description thereof is omitted here.

The end of the guide shaft 54 is supported by the bent portion 94A of an inner chassis 94 having a rectangular shape and the projections 58B, 60B and 62B of the magnification varying lens frame 58, compensator lens frame 60 and focus group frame 62 (see FIG. 1) slidably supported by the guide shaft 54 are slidably engaged with the grooves 90A, 90B and 92A, respectively.

The zooming cam plate 90 and focusing cam plate 92 are guided by guide plates 96, 96,—. Also, the zooming and focusing cam plates 90 and 92 respectively include in the upper surfaces thereof gears 90C and 92B with which gears 72 and 79 fixedly secured to the drive shafts of zooming and focusing actuators 70 and 78 are meshing, respectively.

The above-mentioned zooming and focusing actuators 70 and 78 are placed on the upper surface of the inner chassis 94 in FIG. 8. Also, due to the fact that the inner chassis 94 is fixed to an outer chassis 102 by means of spacers 100, 100,—, there is present between the inner and outer chassis 94 and 102 a space 101 having a length equal to the length of the spacer 100. And, the space 101 is also used as a space for mounting electric parts and thus the inner and outer chassis 94 and 102 serve as base plates as well.

Figure 9:
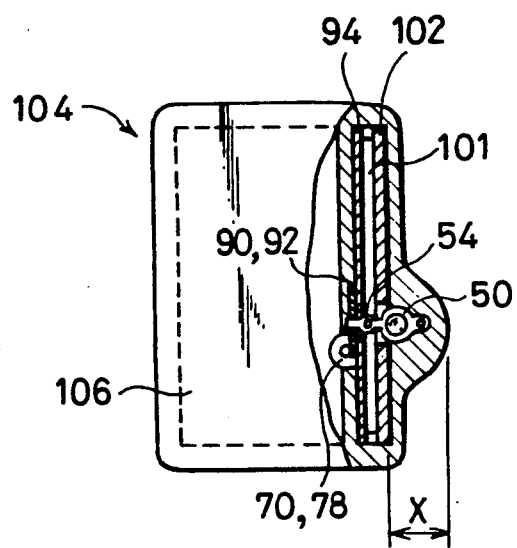
FIG. 9 is a front view to show a state in which the second embodiment of a zoom lens device according to the invention is incorporated in a camera main body.
Figure 11:
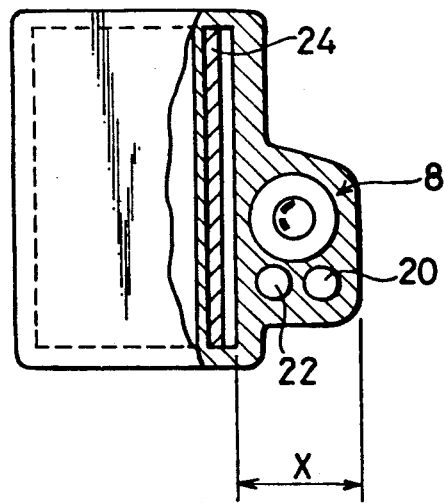
FIG. 11 is a front view to show a state in which the prior art zoom lens device is incorporated in a camera main body.

Referring now to FIG. 9, there is shown a state in which the zoom lens device shown in FIG. 8 is incorporated in the camera main body. As shown in FIG. 9, in a camera 104, there are arranged a mechanical deck 106, lens driving actuators 70, 78, cam plates 90, 92, inner chassis 94, guide shaft 54, outer chassis 102 and zoom lens 50 sequentially in this order starting from the grip side of the camera. For this reason, as shown in FIG. 9, the projection dimension X of the zoom lens can be reduced when compared with the prior art zoom lens device (see FIGS. 10 and 11). Thanks to this, the VTR can be made compact.

Although the above-mentioned first and second embodiments have been described when they are used for the VTR, the invention can also be used for a still camera and the like.

As has been described heretofore, according to a zoom lens device of the invention, the outside diameter of the lens barrel and the projection area can be reduced and at the same time part of the lens barrel can be embedded in the camera main body, so that a camera incorporating the present zoom lens can be made compact.

Also, in assembly, simply by placing all parts forming the zoom lens over the guide shaft, the zoom lens can be assembled while eliminating fine adjustments for assembling, so that the assembling of the zoom lens can be improved.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A zoom lens device having an optical axis and a chassis, said device being adapted for use with a camera having a main body with a side end portion said device, comprising:
- a guide part comprising a plurality of guide shafts extending in parallel with said optical axis and disposed in parallel to one another, one of said plurality of guide shafts being fixedly mounted inside said chassis, means for mounting said chassis being fixedly longitudinally at said side end portion of said camera main body;
- a magnification varying lens group disposed movably on said plurality of guide shafts and guidable in the direction of said optical axis; and
- a focusing lens group disposed movably on said plurality of guide shafts and guidable in the direction of said optical axis, said plurality of guide shafts each supporting said magnification varying lens group and said focusing lens group.

2. A zoom lens device as set forth in claim 1, further comprising zoom drive means for driving said magnification varying lens group and focus driving means for driving said focusing lens group, respectively, said zoom drive means being positioned inside said chassis.

3. A zoom lens device as set forth in claim 2, wherein said zoom drive means comprises a zooming cam plate having a cam groove engageable with a cam follower of said magnification varying lens group and disposed slidably in a direction parallel to said chassis and perpendicular to said optical axis, and a zoom actuator for moving said zoom cam plate by means of a gear mechanism, and said focus drive means comprises a focusing cam plate having a cam groove engageable with a cam follower of said focusing lens group and disposed slidably in a direction parallel to said chassis and perpendicular to said optical axis, and a focus actuator for moving said focusing cam plate by means of a gear mechanism.

4. A zoom lens device as set forth in claim 3, further including means for moving either of said zooming cam plate of said zoom drive means or said focusing cam plate of said focus drive means in said optical axis direction.

5. A zoom lens device adapted for use with a camera, comprising:
- a plurality of parallel guide shafts;
- a zoom lens assembled by inserting or fitting lens groups including a magnification varying lens group and a focusing lens group of said zoom lens, an iris and a lens barrel over said plurality of parallel guide shafts such that at least said magnification lens group and said focusing lens group are supported by each of said plurality of parallel guide shafts; and
- drive means disposed in parallel to said zoom lens for driving said magnification varying and focusing lens groups of said zoom lens in a direction of an optical axis.

* * * * *